United States Patent
Moesle et al.

(10) Patent No.: US 8,538,163 B2
(45) Date of Patent: Sep. 17, 2013

(54) METHOD AND SYSTEM FOR DETECTING EDGES WITHIN AN IMAGE

(75) Inventors: Frank Moesle, Stuttgart (DE); Paul Springer, Stuttgart (DE)

(73) Assignee: Sony Corporation, Tokyo (JP)

( * ) Notice: Subject to any disclaimer, the term of this patent is extended or adjusted under 35 U.S.C. 154(b) by 436 days.

(21) Appl. No.: 12/893,624

(22) Filed: Sep. 29, 2010

(65) Prior Publication Data
US 2011/0085737 A1    Apr. 14, 2011

(30) Foreign Application Priority Data
Oct. 13, 2009 (EP) .................................. 09172915

(51) Int. Cl.
*G06K 9/36* (2006.01)

(52) U.S. Cl.
USPC ............ 382/199; 382/257; 382/263; 382/266

(58) Field of Classification Search
None
See application file for complete search history.

(56) References Cited

U.S. PATENT DOCUMENTS

| | | | |
|---|---|---|---|
| 5,692,072 A | 11/1997 | Hashimoto | |
| 7,003,161 B2 | 2/2006 | Tessadro | |
| 7,151,863 B1* | 12/2006 | Bradley et al. | 382/299 |
| 7,324,701 B2 | 1/2008 | Nakami | |
| 7,657,098 B2* | 2/2010 | Lin et al. | 382/199 |
| 8,086,007 B2* | 12/2011 | Yan et al. | 382/128 |
| 8,189,946 B2* | 5/2012 | Ohira | 382/266 |
| 2002/0006231 A1 | 1/2002 | Jayant et al. | |
| 2006/0165292 A1 | 7/2006 | Li | |
| 2006/0245506 A1 | 11/2006 | Lin et al. | |
| 2007/0052845 A1 | 3/2007 | Adams | |
| 2008/0175513 A1 | 7/2008 | Lai et al. | |
| 2009/0067682 A1* | 3/2009 | Ohk et al. | 382/118 |
| 2010/0008576 A1* | 1/2010 | Piramuthu | 382/173 |
| 2011/0110597 A1* | 5/2011 | Abe et al. | 382/199 |

OTHER PUBLICATIONS

Qixiang Ye, et al., "A New Texture-Insensitive Edge Detection Method", http://ieeexplore.ieee.org/xpls/abs_alljsp?arnumber=1292560, vol. 2, Dec. 15-18, 2003, pp. 768-772.

David R. Martin, et al., "Learning to Detect Natural Image Boundaries Using Local Brightness, Color, and Texture Cues", IEEE Transactions on Pattern Analysis and Machine Intelligence, vol. 26, No. 5, May 2004, pp. 530-549.

Giuseppe Papari, et al., "Adaptive Pseudo Dilation for Gestalt Edge Grouping and Contour Detection", IEEE Transactions on Image Processing, vol. 17, No. 10, Oct. 2008, pp. 1950-1962.

* cited by examiner

*Primary Examiner* — Brian P Werner
(74) *Attorney, Agent, or Firm* — Oblon, Spivak, McClelland, Maier & Neustadt, L.L.P.

(57) ABSTRACT

A method for detecting edges within an image. An edge strength indicator for each pixel within the image is determined and the edge strength indicator is classified into at least three classes to generate a map having one value associated to each class. The classified map is then separated into individual maps depending on the classification. A dilation process is applied to at least a part of the individual maps. The processed and/or individual maps are finally combined by logical operation to obtain a final map indicating edges without nearby texture.

14 Claims, 4 Drawing Sheets

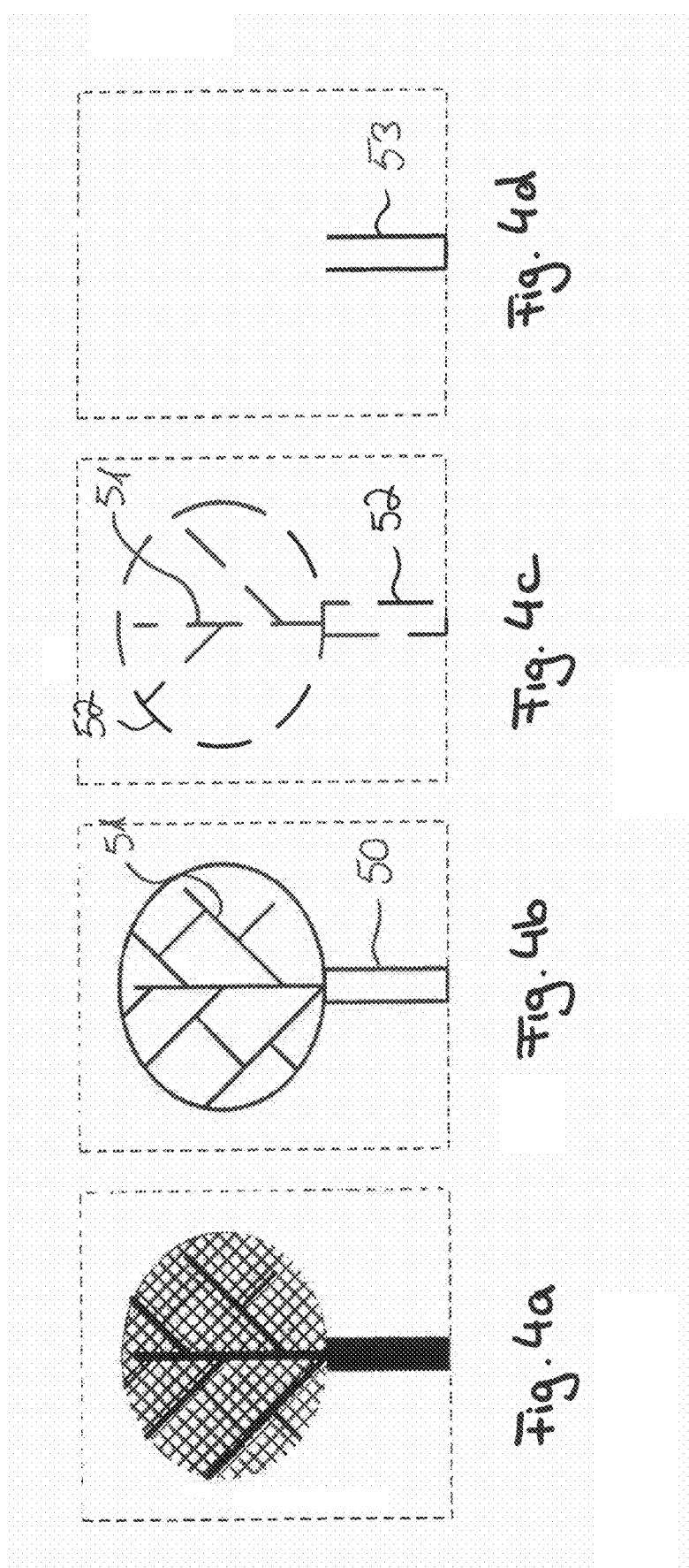

METHOD AND SYSTEM FOR DETECTING EDGES WITHIN AN IMAGE

FIELD OF INVENTION

The present invention relates to a method for detecting edges within an image, to a computer program product for performing the steps of the method, to a system for detecting edges within an image and to an imaging device comprising a system for detecting edges. Specifically, the present invention relates to the detection of edges even in images containing textured areas.

BACKGROUND OF THE INVENTION

For many video processing algorithms, like sharpness enhancement, noise reduction or scaling, it is necessary to distinguish between edges and other areas. Usually a gradient operator, for example the Sobel-operator, is applied to distinguish edges from other areas, using a threshold. High gradients indicate edges, low gradients flat areas. Intermediate gradients may indicate a textured area. Typically to improve robustness, the threshold is adaptive to some properties of the image, e.g. contrast or noise level. The result may be post-filtered with a spatial median filter to increase robustness.

However, this approach usually despite the median filter is not very robust. Also, most approaches fail when being applied to edges which are surrounded by textured areas. Other proposals, for example to use a wavelet decomposition or transform the image into the frequency domain by Fourier transformation suffer from being computationally complex.

SUMMARY OF INVENTION

It is therefore an object of the present invention to reduce the disadvantages of the prior art. Specifically, it is an object of the present invention to provide a method and system for an improved detection of edges within an image.

According to an aspect of the present invention there is provided a method for detecting edges within an image, comprising the steps of
determining an edge strength indicator for each pixel within the image,
classifying the edge strength indicator into at least three classes to generate a map having one value associated to each class,
separating the classified map into individual maps depending on the classification,
applying a dilation process to at least a part of the individual maps and combining the processed and/or individual maps by logical operation to obtain a final map indicating edges without nearby texture.

According to a further aspect of the present invention there is provided a system for detecting edges within an image, comprising
a detection unit that determines an edge strength indicator for each pixel within the image and that classifies the edge strength indicator into at least three classes to generate a map having one value associated to each class,
a separation unit that separates the classified map into individual maps depending on the classification,
at least one dilation unit that applies a dilation process to at least a part of the individual maps, and
a combination unit that combines the processed and/or individual maps by logical operation to obtain a final map indicating edges without nearby texture.

According to still a further aspect of the present invention there is provided a device, preferably a still camera, a video camera or a display, comprising such a system.

According to still a further aspect of the present invention there is provided a system for detecting edges within an image comprising
means for determining an edge strength indicator for each pixel within the image,
means for classifying the edge strength indicator into at least three classes to generate a map having one value associated to each class,
means for separating the classified map into individual maps depending on the classification,
means for applying a dilation process to at least a part of the individual maps and
means for combining the processed and/or individual maps by logical operation to obtain a final map indicating edges without nearby texture.

According to still a further aspect of the present invention there is provided a computer program product stored on a computer readable non-transitory medium which causes a computer to perform the steps of
determining an edge strength indicator for each pixel within the image,
classifying the edge strength indicator into at least three classes to generate a map having one value associated to each class,
separating the classified map into individual maps depending on the classification,
applying a dilation process to at least a part of the individual maps and combining the processed and/or individual maps by logical operation to obtain a final map indicating edges without nearby texture.

Finally, according to still a further aspect of the present invention there is provided a computer readable non-transitory storage medium comprising such a computer program product.

Advantageous features and embodiments are the subject-matter of the dependent claims. Preferred embodiments of the invention are defined in the dependent claims. It shall be understood that the claimed systems, the claimed device, the claimed computer program product and the claimed computer readable storage medium have similar and/or identical preferred embodiments as the claimed method and as defined in the dependent claims.

BRIEF DESCRIPTION OF DRAWINGS

The present invention will now be explained in more detail in the following description of preferred embodiments in relation to the enclosed drawings in which FIG. 4a shows an example of an original image, and FIGS. 4b to 4d show examples of detected edges according to different methods.

DESCRIPTION OF PREFERRED EMBODIMENTS

As already explained according to the state of the art there is usually used a gradient image to detect edges, resulting in a binary edge/other map. Then a post-processing is performed directly on the gradient image, which usually involves diagonal search, neighborhood analysis, median filtering, averaging or the like. A disadvantage of such an algorithm is the regularly occurring mis-detection of details in textured areas as edges.

The present invention therefore proposes an algorithm, specifically a new, better post-processing algorithm for standard edge-detection algorithms in an image processing system or video processing system to get a robust, clean and uniform edge map.

The present invention describes a robust edge-detection for images. An "image" when used in this present specification may be a still image or a moving image. The still image can for example be derived from a digital still picture camera or a scanner or any other device enabling to provide still images. The moving images can be derived from a video camera or any other device enabling capturing moving images, i.e. a sequence of several images. The present invention can also be applied to artificially generated image data like computer generated graphics or the like.

Further, although in the presence invention reference is made to an "image" this is intended to refer to either a complete image or only to parts of an image.

According to the present invention first a gradient analysis is carried out on the image. More specifically, by a gradient operator an edge strength indicator is determined for each pixel of the image. The edge strength indicator is then classified into several classes to generate a map having corresponding different values. More concretely, the edge strength indicator is classified into at least three classes and the generated map correspondingly has at least three values. In other words, with the evaluation of the gradient analysis a multi-state signal map is generated having different levels of details, for example in the case of a tree-state, flat, texture and edge.

The map is then separated into individual maps depending on the classification. In other words, the states are separated into individual maps (bins). The individual maps (bins) are then post-processed.

The processed individual maps are then combined by logical operation to obtain a final map indicating edges without nearby texture. In other words, the processed maps are recombined in such a way that an edge is only detected where there is no texture nearby.

Figure 1:
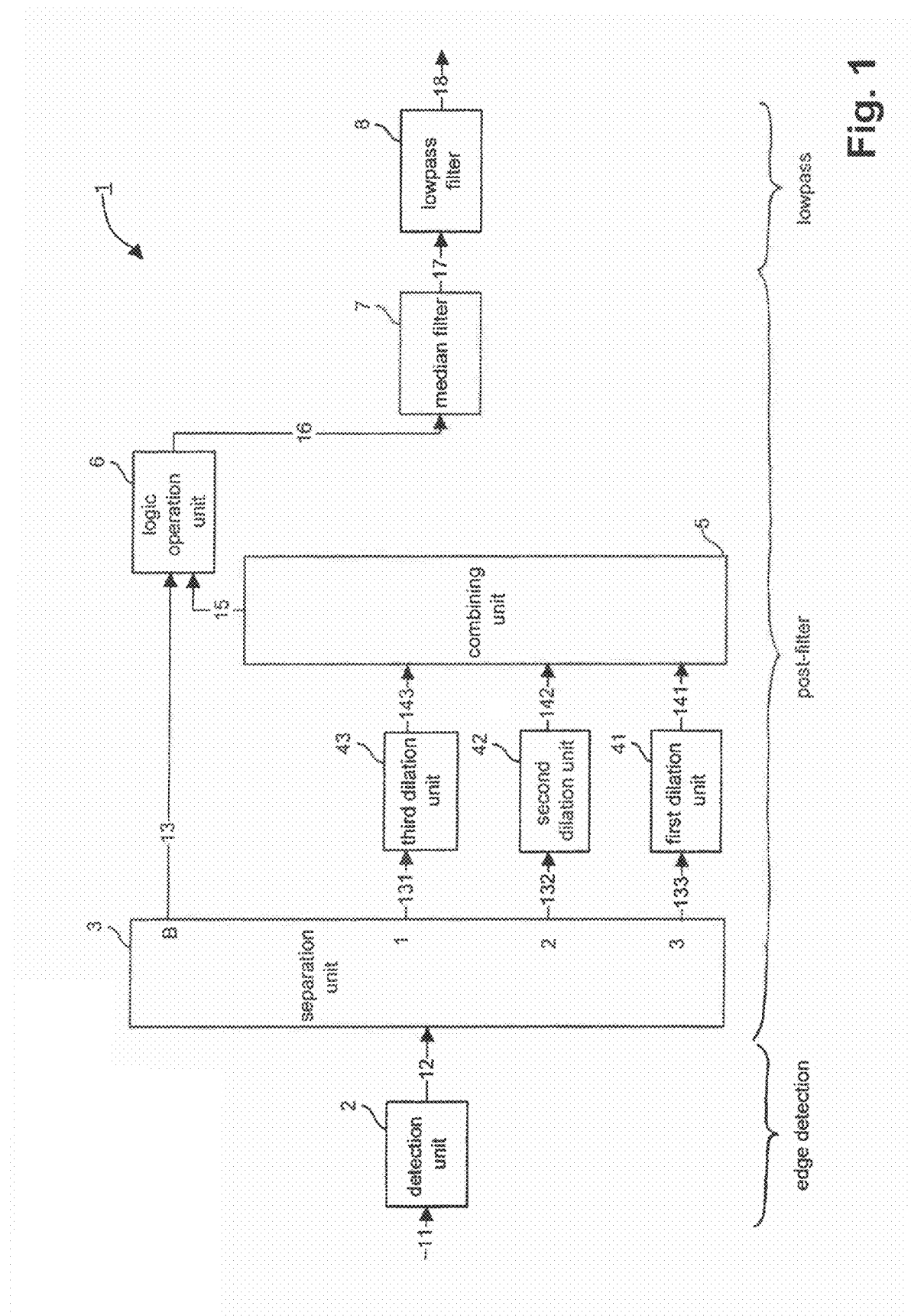
FIG. 1 shows a schematic block diagram of an edge-detection system according to the present invention, FIG. 2 schematically shows different image maps created according to the present invention.

FIG. 1 shows a system 1 for detecting edges within an image according to the present invention.

The system 1 is divided into a part for edge detection, a part for post-filtering and a part for lowpass filtering.

The original image 11 is submitted to a detection unit 2. The detection unit 2 by means of a state of the art gradient operator executed on the image is adapted to detect different states within the image, i.e. to detect at least flat, edge and texture.

One example of this algorithm is the Sobel-operator, but also any other known gradient operator can be used, for example the Laplace-operator, Prewitt-operator, Roberts-operator, Kirsch-operator, Canny-algorithm or the like. The algorithm discriminates between areas with high activity and low activity resulting in an edge strength indicator E for every pixel. The edge strength indicator E has high values on strong edges, intermediate values in textured areas and low values in flat areas.

Within the detection unit 2 the edge strength indicator is classified into at least three classes using corresponding at least two thresholds.

In other words, the edge strength indicator E is classified into B+1 areas, classes or bins. Correspondingly B thresholds T1, T2, ... TB with T1<T2<T3 ... <TB are used. To the pixels having edge strength indicators within one class a single value V is assigned.

With the B thresholds the possible values of the edge strength indication is divided into B+1 classes, i.e. the first class comprises values of E smaller than the first threshold, the second class comprises values of E lying between the first and second threshold or being equal to the first threshold and so on until the last class of values of E being larger than or equal to the largest threshold. To all pixels having edge strength indicators within one class then the same value is assigned, the values are integer numbers running from 0 to B, wherein 0 is assigned to the class with lowest values of E and B is assigned to the class with highest values of E.

B hereby is at least two to obtain at least three classes comprising edge, flat and texture. B preferably lies between 2 and 5. The maximum possible value equals the maximum possible value of the chosen gradient operator, usually 255 for 8-bit integer input signals.

The relationship, how the classes are defined and the values associated to the classes is for example as follows, V=0 if E<T1 (flat area)
V=1 if T1≦E<T2 (intermediate bin 1, low detail texture)
V=2 if T2≦E<T3 (intermediate bin 2, medium detail texture) and so on until
V=B−1 if TB−1≦E<TB (intermediate bin B−1, high detail texture)
V=B if E≧TB (edge).

The threshold operation carried out by the detection unit 2 results in a two-dimensional classified map 12 with values 0, 1, 2, ... B, where 0 represents flat area, B edge area and the intermediate values different detail levels of texture. This classified map 12 is a multi-value map and is very imprecise and noisy and therefore a specific post-processing is provided according to the present invention. For this purpose, the classified map 12 is submitted to a separation unit 3, which separates the map into individual maps depending on the classification.

First the classified map is duplicated B times to obtain maps Nj (j=1, 2 ... B). Each of these copies is then processed in a different way in the separation unit 3. For this purpose the values V within each copy are set to different other values.

From the B copies corresponding B individual maps Nj' are created by defining for each map Nj:

V=0 for all V≠j
V=1 for all V=j

For each map one value of V is taken a basic value. All values differing from this basic value are set to 0 and the basic value itself is set to 1.

Figure 2:
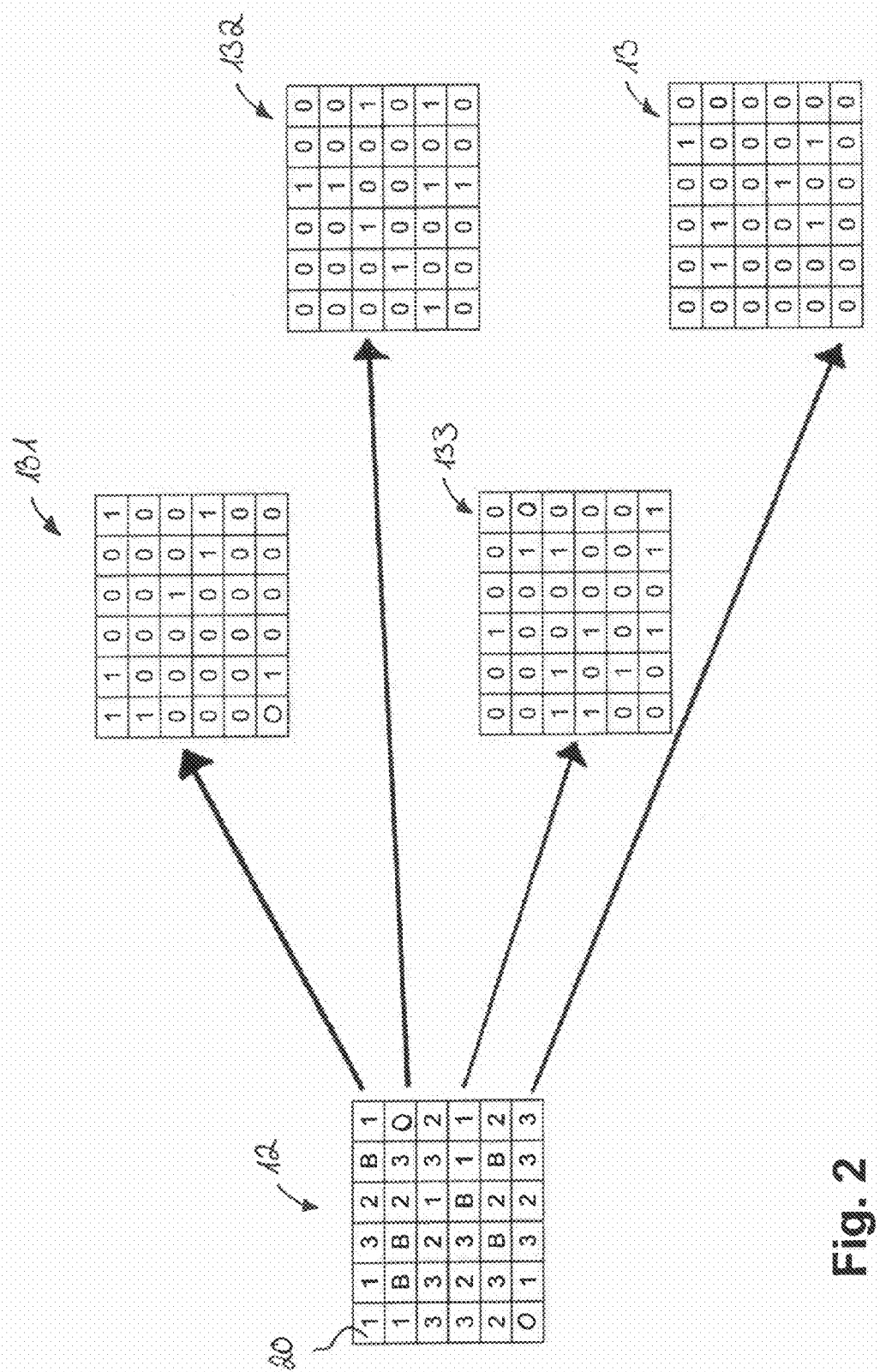

This process is explained in more detail with reference to FIG. 2. FIG. 2 shows the example where B corresponds to 4. In FIG. 2 the classified map 12 is shown where to every pixel 20 a corresponding edge strength indicator E is assigned having values 0, 1, 2, 3 and B (corresponding to 4).

The classified map is then copied four times and in every copy a different operation is carried out according to the above-mentioned equation to obtain the maps Nj' (j=1, 2 ... B).

A first individual map 131 is created by setting all values $V_i$ other than one to zero. As can be seen in the first individual map 131 at the position where previously the value 1 was provided there is still the value 1. On all other positions now there is provided the value 0.

In the second individual map 132 all values other than 2 are set to zero and the values of 2 are set to one. As can be seen on positions where previously there was a 2 now there is a 1. All other positions now have a zero.

The same processing is carried out for to obtain a third individual map 133 and a last individual map 13, whereby this last individual map 13 is obtained by setting all values other than B to zero and by setting the values of B to 1. The individual map NB', having information on edges and resulting from setting the values of B to one, in the following is called "last individual map".

Referring again to FIG. 1, in the preferred embodiment all individual maps 131, 132, 133 except the last individual map 13 are submitted to a corresponding dilation unit. Hereby, either a single dilation unit can be provided or one or more separate dilation units can be provided being associated to one or more of the individual maps.

In the embodiment shown in FIG. 1 the first individual map 131 is submitted to a first dilation unit, the second individual map 132 is submitted to a second dilation unit 42 and the third individual map 133 is submitted to a third dilation unit 43.

In a preferred embodiment no dilation processing is applied to the last individual map 13.

The same dilation process or different dilation processes can be applied to the individual maps. For the dilation process any known or future dilation algorithm can be used. In a preferred embodiment a spatial maximum search is accomplished within a predefined area. The area can be an area of preferably 3×3 pixels, 5×5 pixels or any other shape, e.g. any other rectangular shape or a rhomboid shape or any other mask. Also any state-of-the-art morphological closing filter may be used as a dilation filter, or in combination with a dilation filter.

On the first individual map 131 a dilation operation is performed to increase the texture area and close holes. The resulting texture map can be tapped and used directly as texture detection signal if necessary by other parts of the external video processing system.

The same processing is performed on the other individual maps Nj' for all j=1, 2, . . . B−1. As already explained the dilation process per map can be different from the process of the other maps. For example, it may be suitable to use a larger mask for the spatial maximum search in the low-detail map N1' and a smaller mask in the other maps N2' to NB−1'. The resulting maps are called N1* to NB−1*.

The first dilated individual map 141 is submitted to a combining unit 5. Likewise, also the other dilated individual maps 142, 143 and any other possible map except the last individual map 13 are submitted to a combining unit 5.

The combining unit 5 combines the maps N1* to NB−1* by logical operation to create a new map, for example by OR combination of the maps. The resulting combined map is called N*. The resulting combined map 15 is submitted from the combining unit to a logic operation unit 6. Also the last individual map 13 is submitted to the logic operation unit.

The logic operation unit 6 performs a logic operation to combine the last individual map 13, which is indicated with NB' and the combined map 15, which is indicated with N* to obtain the edge map F.

The values for F are obtained according to the following logic operation:

F=NB' AND (NOT N*)

The following table again gives an overview over the logical operation for combining the last individual map and the combined map:

F=1 for NB'=1 AND N*=0
F=0 for all other cases

The edge map F then has values F=1 only when there is an edge but no texture nearby. Due to the previous dilation process on the texture maps, F=0 where there is either no edge or an edge with nearby texture.

The edge map F is then submitted to a median filter 7. The median filter is applied on the image to eradicate erroneous results. Small spots are eliminated in this process. The median filter can for example have a 3×3 two-dimensional mask, but may have any other mask size as well. The filtered map is called F*. The median process to derive F* from F can be repeated iteratively to filter stronger, even with different mask sizes in the individual steps.

To further smoothen the filtered edge map F*, the filtered edge map 17 is submitted to a lowpass filter 18. This is however optional. The standard lowpass filter can be applied on the filtered edge map F*. Before this lowpass, the value range of the pixels F* should be extended to a higher position to allow inbetween values, for example a conversion from integral numbers, so that any values between F*=0,0 (no edge) and F*=1,0 (edge) are possible as well.

The resulting final map 18 can then be used to control a subsequent algorithm like sharpness enhancement, noise reduction or scaling. For example, the map might be used to blend between the results of two algorithms. Due to the optionally lowpassed output, no hard switching artifacts will be visible between different algorithms.

In the described system 1 is a hardware implementation consisting of a suitable combination of delay lines and logic operation circuits. An alternative implementation is a programmable device, e.g. FPGA. Alternatively, the system may also be implemented as a software solution.

Figure 3:
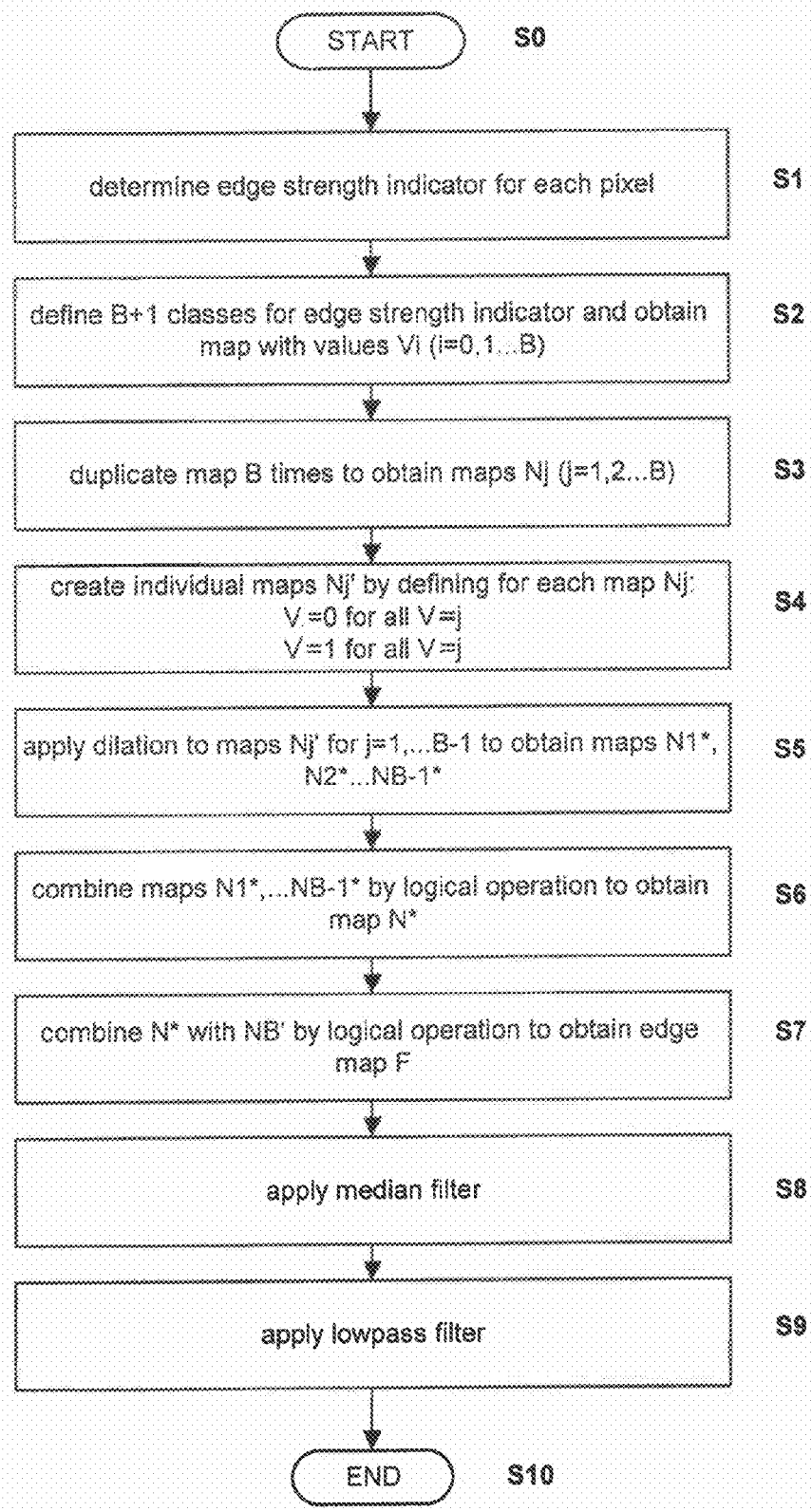
FIG. 3 shows a flow chart showing the process steps of the method according to the present invention.

In the following, the process will again be explained with reference to FIG. 3.

The process starts in step S0. In step S1 the edge strength indicator is determined for each pixel. In step S2 B+1 classes for an edge strength indicator are defined and a map with values V running from 0 to B is obtained. In step S3 the map is duplicated B times to obtain maps Nj (j=1, 2 . . . B).

In step S4 individual maps Nj' are created by defining for each map Nj:

V=0 for all V≠j
V=1 for all V=j

In step S5 dilation to maps Nj' for j=1, . . . B−1 is applied to obtain maps

N1*, N2* . . . NB−1*. In step S6 maps N1*, . . . NB−1* are combined by logical operation to obtain map N*. In step S7 N* is combined with NB' by logical operation to obtain edge map F. In step S8 a median filter is applied to the edge map F. In step S9 optionally a lowpass filter is applied to the median filtered map.

The process ends in step S10.

With reference to FIGS. 4a to 4d the advantage of the present invention will become further apparent.

FIG. 4a shows an example of an original image showing a tree in the foreground and a plane background, e.g. sky.

FIGS. 4b to 4d show different examples of detected edges using different algorithms.

Typically if a state of the art algorithm is used, the output of the edge detection is very imprecise in textured areas. Often, small edges in textured areas (like small branches in an image of tree) are detected as edges, which are usually not desired, since further processing steps on these small edges may deteriorate the quality of the output image.

This is shown when having FIG. 4a as input, resulting into FIG. 4b as output with mis-detection. In FIG. 4b the real edge 50 is correctly detected, but there are also misdetected edges 51, which originally were the branches of the tree. It is usually only desired to detect strong edges (like the shape of the tree in front of a blue sky, as shown in FIG. 4d). The typical approach then is to increase the threshold to detect only strong edges, but this does often not work very well, see FIG. 4c, where the amount of misdetection is reduced, but also some real edges are lost. As can be seen in FIG. 4c, there are still misdetected edges 51 and additionally some real edges now are shown as broken edges 52. This can happen especially when there are high-contrast textures (like a photograph showing a small chess board). If the threshold is set so high that these high-contrast edges are not detected as edges, then low-contrast edges (like a dark tree trunk in front of dark grass) are often not detected.

With the present invention the result will be as shown in FIG. 4b where strong and real edges 53 are reliably detected, but on the other hand misdetection of edges within textures is avoided.

The present method and system can be implemented in any device allowing to process and optionally display still or moving images, e.g. a still camera, a video camera, a TV, a PC or the like.

The above description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for detecting edges within an image, comprising:
   determining an edge strength indicator for each pixel within the image,
   classifying the edge strength indicator into at least three classes to generate a map having one value associated to each class,
   separating the classified map into individual maps depending on the classification,
   applying a dilation process to all of the individual maps except an individual map resulting from a highest class, the individual map including detail information, and
   combining the processed and/or individual maps by logical operation to obtain a final map indicating edges without nearby texture.

2. The method according to claim 1, wherein the edge strength determination is accomplished by a gradient operator.

3. The method according to claim 1 or 2, wherein the at least three classes represent different states of the image comprising flat, texture and edge.

4. The method according to claim 1 or 2, wherein said separating comprises duplicating the classified map B times, wherein B is an integer number corresponding to number of classes minus 1, selecting within each copy a different value as basic value, and setting all values corresponding to the basic value to 1 and the other values to zero.

5. The method according to claim 1 or 2, wherein for the dilation process for each individual map a different mask is used.

6. A method for detecting edges within an image, comprising:
   determining an edge strength indicator for each pixel within the image,
   classifying the edge strength indicator into at least three classes to generate a map having one value associated to each class,
   separating the classified map into individual maps depending on the classification,
   applying a dilation process to at least a part of the individual maps, and
   combining the processed and/or individual maps by logical operation to obtain a final map indicating edges without nearby texture, the combining including combining all maps except a map comprising detail information by a logical OR combination into one combined map.

7. The method according to claim 6, wherein the combining further comprises combining the individual map comprising detail information and the combined map to obtain the edge map.

8. The method according to claim 7, wherein the edge map F is obtained by logical AND NOT combination of the individual map comprising detail information NB' and the combined map N* according to the relationship F=NB' AND (NOT N*), so that F=1 for NB'=1 AND N*=0 and F=0 for all other cases.

9. The method according to claim 1 or 2, further comprising:
   applying a median filter to the combined map.

10. The method according to claim 1 or 2, further comprising:
    applying a low-pass filter to the combined map.

11. A computer readable non-transitory medium encoded with computer readable instructions which cause a computer to perform a method comprising
    determining an edge strength indicator for each pixel within the image,
    classifying the edge strength indicator into at least three classes to generate a map having one value associated to each class,
    separating the classified map into individual maps depending on the classification,
    applying a dilation process to all of the individual maps except an individual map resulting from a highest class, the individual map including detail information, and
    combining the processed and/or individual maps by logical operation to obtain a final map indicating edges without nearby texture.

12. A system for detecting edges within an image, comprising:
    a detection circuit that determines an edge strength indicator for each pixel within the image and that classifies the edge strength indicator into at least three classes to generate a map having one value associated to each class,
    a separation circuit that separates the classified map into individual maps depending on the classification,
    at least one dilation circuit that applies a dilation process to all of the individual maps except an individual map resulting from a highest class, the individual map including detail information, the applying including applying the dilation process using a different mask for each of the individual maps, and
    a combination circuit that combines the processed and/or individual maps by logical operation to obtain a final map indicating edges without nearby texture.

13. A device comprising a system according to claim 12.

14. A system for detecting edges within an image comprising:
- means for determining an edge strength indicator for each pixel within the image,
- means for classifying the edge strength indicator into at least three classes to generate a map having one value associated to each class,
- means for separating the classified map into individual maps depending on the classification,
- means for applying a dilation process to all of the individual maps except an individual map resulting from a highest class, the individual map including detail information, and
- means for combining the processed and/or individual maps by logical operation to obtain a final map indicating edges without nearby texture.

* * * * *